United States Patent
Lee

(10) Patent No.: US 12,231,540 B2
(45) Date of Patent: Feb. 18, 2025

(54) ELECTRONIC DEVICE FOR PERFORMING AUTHENTICATION ON BASIS OF CLOUD SERVER AND CONTROL METHOD THEREFOR

(71) Applicant: LG ELECTRONICS INC., Seoul (KR)

(72) Inventor: Jin Seong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 413 days.

(21) Appl. No.: 17/753,642

(22) PCT Filed: Sep. 10, 2019

(86) PCT No.: PCT/KR2019/011754
§ 371 (c)(1),
(2) Date: Mar. 10, 2022

(87) PCT Pub. No.: WO2021/049681
PCT Pub. Date: Mar. 18, 2021

(65) Prior Publication Data
US 2022/0337401 A1     Oct. 20, 2022

(51) Int. Cl.
*H04L 9/08*     (2006.01)
*H04L 9/32*     (2006.01)

(52) U.S. Cl.
CPC ............ *H04L 9/0825* (2013.01); *H04L 9/085* (2013.01); *H04L 9/0894* (2013.01); *H04L 9/3231* (2013.01)

(58) Field of Classification Search
CPC ..... H04L 9/0825; H04L 9/085; H04L 9/0894; H04L 9/3231; H04L 9/3271; G06F 21/32
See application file for complete search history.

(56) References Cited

U.S. PATENT DOCUMENTS 9,882,719 B2 *  1/2018  Chalamala ............ H04L 9/3228
10,445,487 B2 * 10/2019  Hon ....................... H04W 12/06
(Continued)

FOREIGN PATENT DOCUMENTS

EP              3373554         9/2018
KR    10-2002-0083814         11/2002
(Continued)

OTHER PUBLICATIONS

PCT International Application No. PCT/KR2019/011754, International Search Report dated Jun. 10, 2020, 4 pages.

*Primary Examiner* — Han Yang
(74) *Attorney, Agent, or Firm* — LEE, HONG, DEGERMAN, KANG & WAIMEY

(57) ABSTRACT

Disclosed is an electronic device that operates based on a cloud server including a biometric sensor, a database that stores identification information on at least one of the biometric sensor, a user, and the electronic device and biometric information registered by the biometric sensor, and at least one processor, wherein the processor receives an authentication request of an authentication server through the cloud server, acquires biometric information of a user through the biometric sensor in response to the authentication request being received, determines whether the acquired biometric information corresponds to biometric information stored in the database, generates a response value including information on a result of the determining, and transmits the response value and the identification information to the cloud server, and the response value is transmitted to the authentication server when the transmitted identification information matches at least one of identification information stored in the cloud server.

16 Claims, 9 Drawing Sheets

(56) References Cited

U.S. PATENT DOCUMENTS

| | | |
|---|---|---|
| 10,664,581 B2 | 5/2020 | Hou et al. |
| 10,755,237 B2 * | 8/2020 | Song ................... G06Q 20/3829 |
| 11,075,760 B1 * | 7/2021 | Bachenheimer ........ G10L 17/24 |
| 2008/0295160 A1 * | 11/2008 | Cuprin .................... G06F 21/34 |
| | | 726/7 |
| 2014/0157394 A1 * | 6/2014 | Koonjbearry ....... H04L 63/0823 |
| | | 726/10 |
| 2019/0012450 A1 * | 1/2019 | Hou ........................ G06F 21/32 |
| 2019/0182229 A1 * | 6/2019 | Maiti ...................... H04L 63/10 |
| 2021/0105139 A1 * | 4/2021 | Choi ..................... H04L 9/3231 |
| 2021/0234857 A1 * | 7/2021 | Nakagawa ............ H04L 9/3236 |
| 2022/0191016 A1 * | 6/2022 | Brown .................. H04L 63/107 |

FOREIGN PATENT DOCUMENTS

| | | | | |
|---|---|---|---|---|
| KR | 10-2012-0087644 | | 8/2012 | |
| KR | 10-2014-0138991 | | 12/2014 | |
| KR | 10-1755995 | | 7/2017 | |
| KR | 10-2018-0016641 | | 2/2018 | |
| KR | 20180016641 A | * | 2/2018 | ............... H04L 9/30 |

* cited by examiner

ELECTRONIC DEVICE FOR PERFORMING AUTHENTICATION ON BASIS OF CLOUD SERVER AND CONTROL METHOD THEREFOR

CROSS-REFERENCE TO RELATED APPLICATIONS

This application is the National Stage filing under 35 U.S.C. 371 of International Application No. PCT/KR2019/011754, filed on Sep. 10, 2019, the contents of which is hereby incorporated by reference herein in its entirety.

TECHNICAL FIELD

The present disclosure relates to an electronic device that operates based on a cloud server and a control method thereof. More particularly, the present disclosure relates to an electronic device that operates based on a cloud server and performs authentication using a sensor included in the electronic device and a control method thereof.

BACKGROUND ART

With the development of electronic technology, portable electronic devices such as smartphones may provide various functions. For example, the portable electronic devices may provide functions ranging from simple functions such as sending and receiving messages to functions requiring high specifications such as games. As such, to smoothly provide various functions, the portable electronic device has been developed to include a high-performance processor and a large-capacity memory.

In general, the processor and the memory may increase in size in proportion to a performance. However, the portable electronic device is limited in size because portability has to be considered. Therefore, the development of a technology for improving a performance while maintaining a small size is being actively made.

Recently, considering the portability and the performance improvement of the portable electronic device, there has emerged a concept of a cloud phone that has hardware with minimum performance and provides functions through a connection to a cloud server. The development of the cloud phone is also being actively made. Since most of the elements required to operate the cloud phone, such as applications and data, are stored in the cloud server, the cloud phone has to be connected to the cloud server to provide various functions based on the applications.

In terms of the cloud phone, since the application for providing functions is executed on the cloud server, the hardware may act as a simple device for connection to the cloud server, that is, as an intermediary device. In this case, the cloud phone does not require a high-performance processor or large-capacity memory, so the portability may be secured.

Meanwhile, as described above, the cloud server may provide various functions by executing various applications. However, because the cloud server does not directly contact a user, the cloud server may be implemented in a form that does not include a sensor (e.g., fingerprint recognition sensor and iris sensor). Thus, the cloud phone that operates based on the cloud server may be restricted on the use of functions using sensors.

Accordingly, there is a desire for a method of providing a function using a sensor such as biometric authentication even in the cloud phone that operates based on the cloud server.

Further, for the cloud server that is accessed by a plurality of electronic devices and vulnerable to security, a method to provide an authentication function with enhanced security is required.

DISCLOSURE OF INVENTION

Technical Goals

An aspect provides an electronic device that operates based on a cloud server and provides a function using a sensor and a control method thereof.

The technical goals to be achieved by the example embodiments of the present disclosure are not limited to the technical goals described above, and although not mentioned, other technical goals that will be clearly understood by those skilled in the art may be inferred from the following example embodiments.

Technical Solutions

According to an aspect, there is provided an electronic device that operates based on a cloud server, the electronic device including a biometric sensor, a database in which identification information on at least one of the biometric sensor, a user, and the electronic device and biometric information registered by the biometric sensor are stored, and at least one processor, wherein the at least one processor is configured to receive an authentication request of an authentication server through the cloud server, acquire biometric information of a user through the biometric sensor in response to the authentication request being received, determine whether the acquired biometric information corresponds to biometric information stored in the database and generate a response value including information on whether the acquired biometric information corresponds to the stored biometric information, and transmit the generated response value and the identification information to the cloud server, and the generated response value is transmitted to the authentication server when the transmitted identification information matches at least one of pieces of identification information previously stored in the cloud server.

According to another aspect, there is also provided a biometric authentication method of an electronic device that operates based on a cloud server, the biometric authentication method including receiving an authentication request of an authentication server through the cloud server, acquiring biometric information of a user through a biometric sensor in response to the authentication request being received, determining whether the acquired biometric information corresponds to biometric information previously stored and generating a response value including information on whether the acquired biometric information corresponds to the previously stored biometric information, and transmitting the generated response value and identification information on at least one of the biometric sensor, a user, and the electronic device to the cloud server, wherein the generated response value is transmitted to the authentication server when the transmitted identification information matches at least one of pieces of identification information previously stored in the cloud server.

According to another aspect, there is also provided a biometric authentication system using a cloud server, the biometric authentication system including the cloud server, an electronic device that operates based on the cloud server, and an authentication server to which an authentication is requested, wherein the electronic device includes a biometric sensor, a database in which identification information on at least one of the biometric sensor, a user, and the electronic device and biometric information registered by the biometric sensor are stored, and at least one processor, the at least one processor is configured to receive an authentication request of an authentication server through the cloud server, acquire biometric information of a user through the biometric sensor in response to the authentication request being received, determine whether the acquired biometric information corresponds to biometric information stored in the database, generate a response value including information on whether the acquired biometric information corresponds to the stored biometric information, and transmit the generated response value and the identification information to the cloud server, the cloud server is configured to provide the response value and the identification information to the authentication server, and the authentication server is configured to decrypt the response value using a previously stored public key when the identification information matches at least one of pieces of identification information previously stored in the authentication server.

Effects

According to example embodiments, it is possible to provide an electronic device that operates based on a cloud server and provides a function (e.g., user authentication function) using a sensor, and a control method.

Further, according to example embodiments, an electronic device and a control method thereof may control a transmission of a response value for authentication to an authentication server based on identification information registered in a cloud server, thereby improving the security of an authentication function through a cloud server.

Effects of the present disclosure are not limited to the above-mentioned effects, and other effects that are not mentioned will be clearly understood by those skilled in the art from the description of the scope of the claims.

BEST MODE FOR CARRYING OUT THE INVENTION

Figure 1:
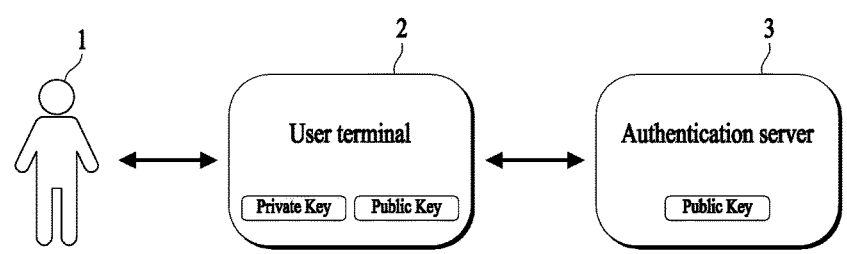
FIG. 1 is a diagram illustrating a biometric authentication system.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined by the appended claims.

In the description of embodiments, detailed description of well-known related structures or functions will be omitted when it is deemed that such description will cause ambiguous interpretation of the present disclosure. Terminologies used herein are defined to appropriately describe the example embodiments of the present disclosure and thus may be changed depending on a user, the intent of an operator, or a custom. Accordingly, the terminologies must be defined based on the following overall description of this specification.

While example embodiments of the inventive concepts are capable of various modifications and alternative forms, embodiments thereof are shown by way of example in the drawings and will herein be described in detail. It should be understood, however, that there is no intent to limit this disclosure to the particular example embodiments disclosed. On the contrary, example embodiments are to cover all modifications, equivalents, and alternatives falling within the scope of the example embodiments.

It will be understood that, although the terms first, second, etc. may be used herein to describe various elements, these elements should not be limited by these terms. These terms are only used to distinguish one element from another.

When an element, such as a layer, region, or substrate, is described as being "on," "connected to," or "coupled to" another element, it may be directly "on," "connected to," or "coupled to" the other element, or there may be one or more other elements intervening therebetween.

FIG. 1 is a diagram illustrating a biometric authentication system. Specifically, FIG. 1 conceptually shows a biometric authentication system used in a user terminal (or electronic device) such as a smartphone.

Referring to FIG. 1, a user terminal 2 such as a smartphone may provide an authentication function based on biometric information acquired from a user 1. Here, the authentication may refer to, for example, a process of verifying whether a user who insists that the user is "A" is "A." The authentication function may refer to a function of the user terminal 2 that allows the authentication to be performed.

To provide the authentication function, the user terminal 2 may acquire biometric information (e.g., fingerprint) of the user 1 through a sensor (e.g., fingerprint recognition sensor) included in the user terminal 2 and perform the authentication based on whether the acquired biometric information matches previously registered biometric information.

For the provision of the authentication function, a user registration process may be required before the authentication function is used. Specifically, in order to provide the authentication function, a process of registering biometric information of a user in the user terminal 2 in relation to the authentication function and generating a private key for encrypting specific information and a public key for decrypting the information encrypted by the private key may be required. At this time, the private key may be stored in the user terminal 2, and the public key may be transmitted to an authentication server and stored in the authentication server.

When the execution function is executed, the user terminal 2 may acquire the biometric information of the user 1 through a biometric sensor and determine whether the acquired biometric information matches the registered biometric information of the user. When the acquired biometric information matches the registered biometric information of the user, the authentication may be successful. When the acquired biometric information does not match the registered biometric information of the user, the authentication may fail.

A response value may be generated as a result related to whether the authentication is successful. The response value may be encrypted by the private key generated in the registration process and transmitted to an authentication server 3.

The authentication server 3 may decrypt the response value using the previously stored public key, acquire information on whether the authentication is successful, and determine whether the authentication is successful.

Such provision of the authentication function may be performed by directly connecting the user terminal 2 including the biometric sensor and the authentication server 3 to transmit and receive authentication-related information (e.g., response value) to and from each other.

However, in terms of an electronic device that operates based on a cloud server, because a function provided through the electronic device is actually provided through the cloud server while the cloud server does not include a sensor, a method different from the authentication function executed based on the direct connection between the electronic device and the authentication server may be required.

In addition, because the cloud server is accessed by a plurality of electronic devices, even if the authentication function is provided, a security problem may occur.

Considering such aspects, the below-described electronic device and control method thereof according to an example embodiment of the present disclosure may operate based on a cloud server and provide an authentication function with improved security.

Figure 2:
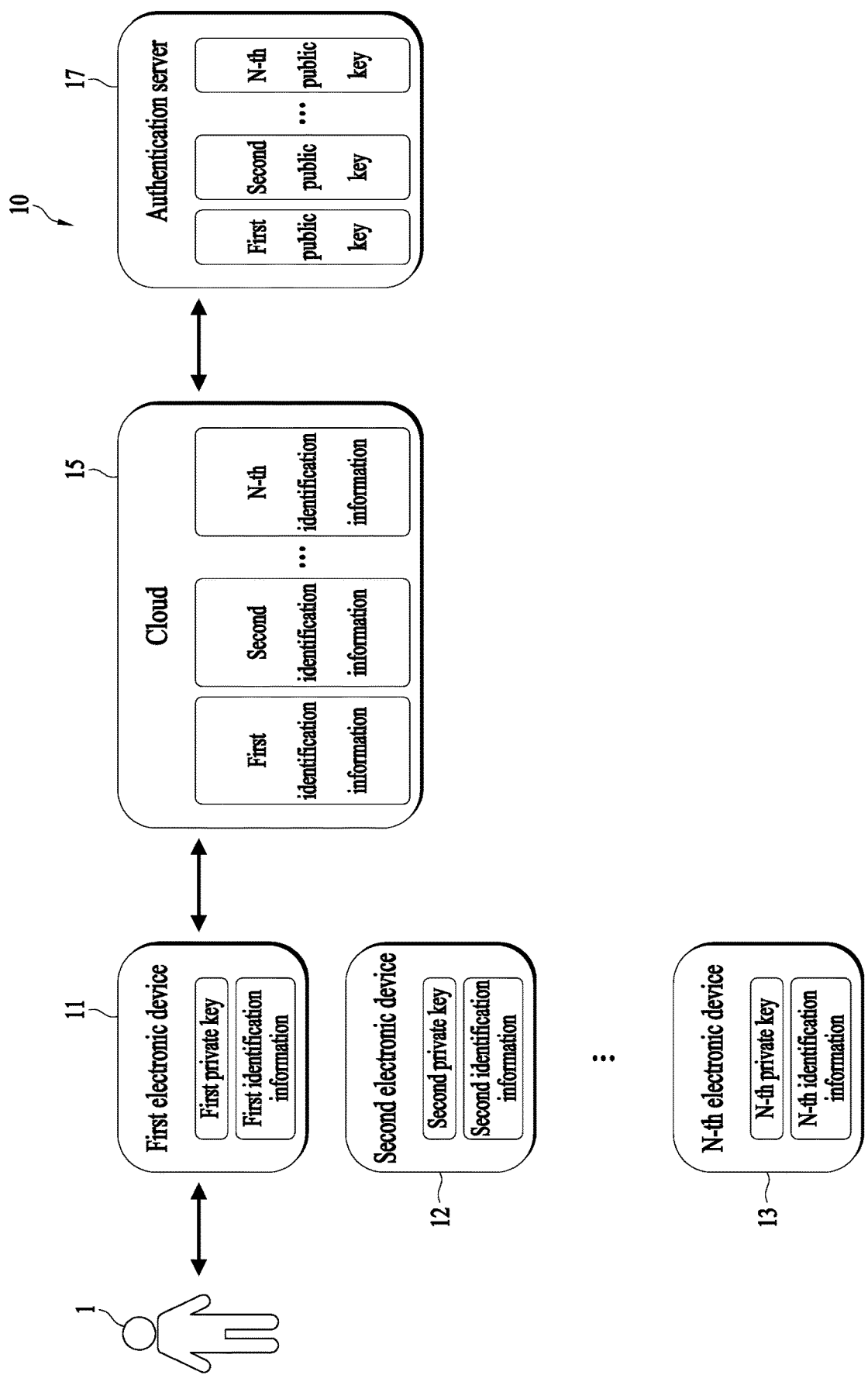
FIG. 2 is a diagram illustrating an example of a biometric authentication system according to an example embodiment of the present disclosure.

FIG. 2 is a diagram illustrating an example of a biometric authentication system according to an example embodiment of the present disclosure. Specifically, FIG. 2 conceptually shows a biometric authentication system 10 for using an authentication function in an electronic device that operates based on a cloud server 15.

Referring to FIG. 2, the biometric authentication system 10 may include a plurality of electronic devices (e.g., a first electronic device 11, a second electronic device 12, an N-th electronic device 13, N being a natural number of 2 or more), the cloud server 15, and an authentication server 17.

The plurality of electronic devices may be an electronic device, for example, a cloud phone that operates based on the cloud server 15. The plurality of electronic devices may be different types of electronic devices. For example, some of the plurality of electronic devices may be a mobile terminal, and some of the plurality of electronic devices may be a personal computer (PC).

The cloud server 15 may be a device that stores various applications and data for operating the plurality of electronic devices. In response to being connected to the cloud server 15, the plurality of electronic devices may operate by executing an application stored in the cloud server 15 on the cloud server 15.

The authentication server 17 may be a server to which a user authentication is requested to provide a specific function (e.g., financial function). For example, the authentication server 17 may be a server provided by a bank.

The plurality of electronic devices may be devices of which authentication functions are registered in the cloud server 15. Specifically, the plurality of electronic devices may include at least one sensor related to a biometric authentication and be previously registered in a cloud server 25 to perform a biometric authentication function based on the at least one sensor.

Specifically, a description is given of the first electronic device 11 as an example in relation to a registration of the authentication function. When registering the authentication function, the first electronic device 11 may generate identification information (hereinafter, also referred to as "first identification information") on at least one of the user 1 of the first electronic device 11, a biometric sensor (e.g., iris recognition sensor and fingerprint recognition sensor), and the first electronic device 11.

The first electronic device 11 may store the first identification information in a database of the first electronic device 11 and also transmit the first identification information to the cloud server 15.

In addition, when registering the authentication function, the first electronic device 11 may acquire the biometric information of the user 1 through the biometric sensor. The first electronic device 11 may store the acquired biometric information in the database of the first electronic device 11.

When registering the authentication function, the first electronic device 11 may generate the private key and the public key described with reference to FIG. 1. For example, the first electronic device 11 may generate the first private key and the first public key. The first electronic device 11 may store the first private key in the database and transmit the first public key to the cloud server 15.

In response to the first public key being received, the cloud server 15 may transmit the first public key to the authentication server 17. The authentication server 17 may store the first public key. Through this, a process of registering the authentication function for the first electronic device 11 may be completed.

Meanwhile, such registration process may be performed for each of the plurality of electronic devices 11, 12, and 13, individually. That is, the aforementioned operations related to the first electronic device 11 is performed in the second electronic device 12 through the N-th electronic device 13, so that the cloud server 15 acquires information (e.g., the first identification information, second identification information, and N-th identification information) on devices capable of performing the authentication function and stores the information.

After the authentication function is registered, the first electronic device 11 may provide the authentication function. To provide the authentication function, the first electronic device 11 may acquire an input for requesting the authentication function from the user 1. In this case, the cloud server 15 that drives the first electronic device 11 may sense the input. In response to the input being sensed, the cloud server 15 may transmit a request for initiating an operation to the authentication server 17.

When the request for initiating the operation, the authentication server 17 may transmit an authentication request (or a signal for requesting an authentication).

When the authentication request is received from the authentication server 17, the cloud server 15 may start an execution of the authentication function through a biometric sensor of the first electronic device 11. In some cases, a notification indicating that the execution of the authentication function starts may be provided together. For example, a text notification "Perform iris recognition" may be provided, but the present example is not taken as being limited thereto.

When the authentication function starts, the first electronic device 11 may acquire biometric information of a user using the biometric sensor. The first electronic device 11 may determine (or verify) whether the acquired biometric information corresponds to (or matches) biometric information acquired in the registration process and previously stored.

For example, the first electronic device 11 may calculate a similarity between the acquired biometric information and the previously stored biometric information and determine whether the calculated similarity is greater than or equal to a predetermined value. When the calculated similarity is greater than or equal to the predetermined value, the first electronic device 11 may determine that the acquired biometric information corresponds to the previously stored biometric information. When the calculated similarity is less than the predetermined value, the first electronic device 11 may determine that the acquired biometric information does not correspond to the previously stored biometric information. However, a method of determining a correspondence is not limited to the foregoing example, and various methods may apply thereto.

The first electronic device 11 may generate a response value related to whether the acquired biometric information corresponds to the previously stored biometric information. The first electronic device 11 may transmit the generated response value to the cloud server 15. At this time, the first electronic device 11 may transmit the generated response value along with the first identification information generated in the registration process to the cloud server 15.

The cloud server 15 may determine whether the received first identification information corresponds to one of pieces of the stored identification information. When the received first identification information corresponds to one of the pieces of the stored identification information, the cloud server 15 may transmit the received response value to the authentication server 17. In some cases, the cloud server 15 may transmit the response value and identification information on an electronic device that has generated the response value together.

The authentication server 17 may decrypt the response value based on the public key stored. The authentication server 17 may identify information included in the decrypted response value and determine whether the authentication server 17 is accessible through the cloud server 15.

For example, when the decrypted response value includes information indicating success in authentication, the authentication server 17 may terminate the authentication request and allow an access to the authentication server 17. When the decrypted response value includes information indicating a failure in authentication, the authentication server 17 may transmit the authentication request again or disallow the access to the authentication server 17.

Meanwhile, the authentication server 17 may include identification information on an electronic device related to each public key stored. Thus, the authentication server 17 may perform decryption by selecting a public key by which the response value is to be decrypted. In a case in which the identification information is not included, the authentication server 17 may perform decryption using stored public keys in sequence. That is, the decryption may be performed by randomly selecting the stored public keys until a public key suitable for the decryption is found.

According to the example embodiment of FIG. 2, the cloud server 15 may include identification information on each of the plurality of electronic devices and preferentially determine whether the plurality of electronic devices corresponds to a registered electronic device in association with the authentication function, which may lead to an improvement of security.

In some cases, the cloud server 15 may acquire the biometric information of the user 1 (e.g., fingerprint information and iris information) from an electronic device (e.g., the first electronic device 11) at the time of registering the authentication, and store the acquired information. Further, the cloud server 15 may store identification information on the user 1 in addition to the biometric information. In such cases, the cloud server 15 may allow the authentication to be performed by comparing the stored biometric information and the identification information on the user 1 to the biometric information and identification information acquired when the authentication function is provided.

Specifically, in the example embodiment, the first electronic device 11 may include a fingerprint recognition sensor to register the authentication function in the cloud server 15 using fingerprint information of the user 1. In this example, the cloud server 15 may store the fingerprint information of the user 1 and the identification information indicating the user 1.

After that, the user 1 may perform authentication using another device (e.g., the second electronic device 12) including the fingerprint recognition sensor when using the authentication function. For example, the user 1 may authenticate identification information by logging in to the cloud server 15 using another device based on the identification information and authenticate biometric information by recognizing a fingerprint using a fingerprint sensor of the other device, so that the authentication is performed. In the example embodiment, the fingerprint is used in association with the biometric sensor and information as an example, but the present example is not taken as being limited thereto.

As such, when the biometric information and the identification information are stored in the cloud server 15 to provide the authentication function, once biometric information to be used for the authentication is registered in the cloud server 15, the user may use the authentication function through another device without needing to verify every electronic device.

Figure 3:
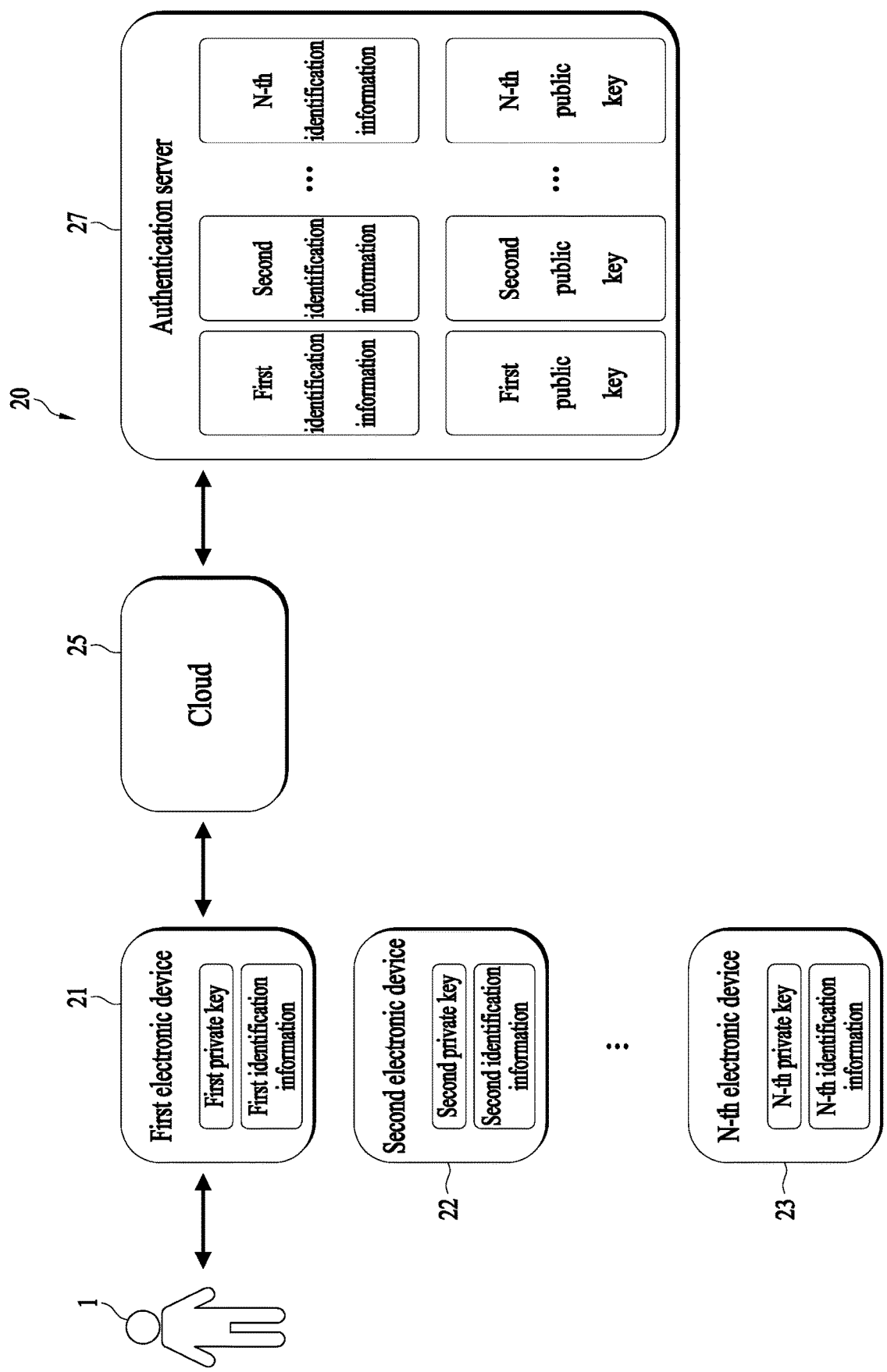
FIG. 3 is a diagram illustrating another example of a biometric authentication system according to an example embodiment of the present disclosure.

FIG. 3 is a diagram illustrating another example of a biometric authentication system according to an example embodiment of the present disclosure. In the following description of FIG. 3, redundant content of FIG. 2 may be omitted.

Referring to FIG. 3, a biometric authentication system 20 may include a plurality of electronic devices (e.g., a first electronic device 21, a second electronic device 22, and an N-th electronic device 23, N being a natural number of 2 or more), a cloud server 25, and an authentication server 27.

The plurality of electronic devices may each be a device including a biometric sensor to provide an authentication function through the cloud server 25. Each of the plurality of electronic devices may register an authentication function in the cloud server 15 in advance to provide the authentication function.

Specifically, a description is given of the first electronic device 21 as an example in relation to a registration of the authentication function. When registering the authentication function, the first electronic device 21 may generate identification information (hereinafter, also referred to as "first identification information") on at least one of the user 1 of the first electronic device 21, a biometric sensor (e.g., iris recognition sensor and fingerprint recognition sensor), and the first electronic device 21.

The first electronic device 21 may store the first identification information in a database of the first electronic device 21 and also transmit the first identification information to the cloud server 15.

In addition, when registering the authentication function, the first electronic device 21 may acquire the biometric information of the user 1 through the biometric sensor. The first electronic device 21 may store the acquired biometric information in the database of the first electronic device 21.

When registering the authentication function, the first electronic device 21 may generate the private key and the public key described with reference to FIG. 1. That is, the first electronic device 21 may generate a first private key and a first public key. The first electronic device 21 may store the first private key in the database and transmit the first public key to the cloud server 15.

The cloud server 15 may transmit the first identification information and the first public key received from the first electronic device 21 to the authentication server 27. When the first identification information and the first public key are received from the cloud server 15, the authentication server 27 may store the received first identification information and first public key in the authentication server 27. In some cases, the first identification information and the first public key may be stored in association with each other.

When the first identification information and the first public key are stored in the authentication server 27, a process of registering the authentication function for the first electronic device 11 may be completed.

Meanwhile, such registration process may be performed for each of the plurality of electronic devices 21, 22, and 23, individually. Accordingly, the authentication server 27 may store information on the plurality of electronic devices (e.g., the first identification information, second identification information, N-th identification information, the first public key, a second public key, and an N-th public key).

After the authentication function is registered, the first electronic device 21 may provide the authentication function. When the authentication function is initiated, the first electronic device 11 may receive an authentication request from the authentication server 27 through the cloud server 25.

In response to the authentication request being received, the first electronic device 21 may acquire the biometric information of the user 1 using a biometric sensor. The first electronic device 21 or the first electronic device 11 may determine whether the acquired biometric information corresponds to biometric information acquired in the registration process and previously stored.

The first electronic device 21 may generate a response value related to whether the acquired biometric information corresponds to the previously stored biometric information. The first electronic device 21 may transmit the generated response value to the cloud server 15. At this time, the first electronic device 21 may transmit the generated response value along with the first identification information generated in the registration process to the cloud server 25.

Meanwhile, in some cases, the first private key for encrypting the response value when registering the authentication may be generated. In such cases, the generated response value may be encrypted using the first private key so as to be transmitted to the cloud server 25.

The first electronic device 21 may transmit the response value along with the first identification information generated at the time of registering the authentication to the cloud server 25. The cloud server 25 may transmit the response value and the first identification information received from the first electronic device 21 to the authentication server 27.

The authentication server 27 may determine whether the received first identification information corresponds to one of pieces of the stored identification information. When the received first identification information corresponds to one of the pieces of the stored identification information, the authentication server 27 may decrypt the received response value using the first public key stored previously.

The authentication server 27 may identify information included in the decrypted response value and determine whether the authentication server 27 is accessible through the cloud server 25.

For example, when the decrypted response value includes information indicating success in authentication, the authentication server 27 may terminate the authentication request and allow an access to the authentication server 27. When the decrypted response value includes information indicating a failure in authentication, the authentication server 27 may transmit the authentication request again or disallow the access to the authentication server 27.

According to the example embodiment of FIG. 3, the authentication server 27 may include identification information on each of the plurality of electronic devices and preferentially determine whether the plurality of electronic devices corresponds to a registered electronic device in association with the authentication function, which may lead to an improvement of security.

Figure 4:
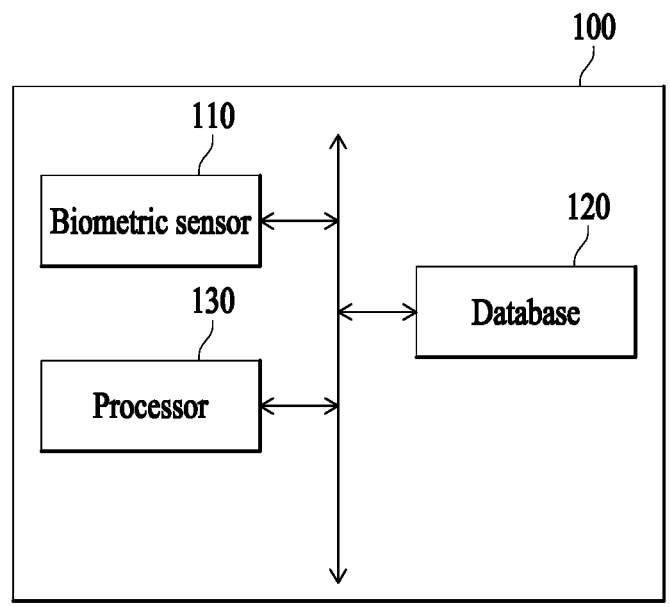
FIG. 4 is a functional block diagram illustrating an electronic device according to an example embodiment of the present disclosure.

FIG. 4 is a functional block diagram illustrating an electronic device according to an example embodiment of the present disclosure. A configuration of the electronic device described below may be implemented by hardware, software, or a combination of hardware and software.

Referring to FIG. 4, an electronic device 100 may include a biometric sensor 110, a database 120, and a processor 130. The biometric sensor 110 and the database 120 may operate based on a connection to the processor 130. In some cases, the biometric sensor 110 and the database 120 may each include an individual processor.

The biometric sensor 110 may be a sensor that acquires biometric information of a user. The biometric information may refer to information on unique characteristics of a living body that each individual has and may be information, for example, an iris, a fingerprint, and the like. The biometric sensor 110 is a sensor that acquires the biometric information and may include, for example, an iris recognition sensor and a fingerprint sensor. In addition, the biometric sensor 110 may include various known sensors.

The biometric sensor 110 may include acquirable biometric information or unique identification information indicating itself, such as an identification number given when the sensor is manufactured. The identification information of the biometric sensor 110 may be stored in the database 120 as described below.

In some cases, the electronic device 100 may include a plurality of biometric sensors of different types. In such cases, each of the biometric sensors may include identification information, and the identification information may be stored in the database 120.

When an authentication function is registered or the authentication function is executed, the biometric sensor 110 may operate to acquire the biometric information of the user.

The database 120 may store identification information on at least one of the biometric sensor 110, the user, and the electronic device 100 and biometric information registered by the biometric sensor 110.

The identification information on the biometric sensor 110 may include, for example, at least one of a type of biometric information to be acquired by the biometric sensor 110, a unique identification number given at the time of manufacturing the biometric sensor 110, a specific identification number assigned to the biometric sensor 110 by the user.

The identification information on the user may include, for example, at least one of information on an account of a user accessing the cloud server to drive the electronic device 100 and information on the user stored by the user.

The identification information on the electronic device 100 may include, for example, at least one of a unique identification number (e.g., international mobile equipment identity (IMEI)) given at the time of manufacturing the electronic device 100 and a specific identification number assigned to the electronic device 100 by the user.

The database 120 may store biometric information acquired by the biometric sensor 110 when registering an authentication function and used for the registration. The biometric information may be biometric information of a user who is a target for authentication when registering the authentication function.

In some cases, the database 120 may store a private key generated when the authentication function is registered. The private key is information for encrypting information on an authentication function result when the authentication function is registered, and may be provided as a pair with a public key generated together when the private key is generated. Here, the public key is used for decrypting the information encrypted based on the private key and may be stored in the authentication server as described with reference to FIGS. 2 and 3.

The processor 130 may receive an authentication request of the authentication server through the cloud server. Specifically, the processor 130 may acquire a user input to start the authentication function of the cloud server. In this case, the cloud server may transmit, to the authentication server, a signal for starting the authentication function based on the acquired input.

When the authentication function starts, the authentication server may transmit the authentication request to the cloud server. Accordingly, the processor 130 may receive the authentication request through the cloud server.

The processor 130 may acquire the biometric information of the user through the biometric sensor in response to the authentication request being received. When the biometric sensor is a fingerprint recognition sensor, the processor 130 may acquire fingerprint information of the user by inducing a fingerprint recognition action of the user. When the biometric sensor is an iris recognition sensor, the processor 130 may acquire iris information of the user by inducing an iris recognition action of the user.

The processor 130 may induce a biometric recognition in various ways. As an example, a notification in a text form may be provided to the user such that the user performs the biometric recognition. As another example, a sound notification may be provided to the user such that the user performs the biometric recognition.

The processor 130 may determine whether the acquired biometric information corresponds to the biometric information stored in the database 120. The processor 130 may compare the acquired biometric information and the stored biometric information, thereby determining whether the acquired biometric information and the stored biometric information are acquired from the same user.

For example, the processor 130 may calculate a similarity between the acquired biometric information and the stored biometric information and determine whether the calculated similarity is greater than or equal to a predetermined value. When the calculated similarity is greater than or equal to the predetermined value, the processor 130 may determine that the acquired biometric information corresponds to the stored biometric information. When the calculated similarity is less than the predetermined value, the processor 130 may determine that the acquired biometric information does not correspond to the stored biometric information.

The processor 130 may generate a response value based on the aforementioned determination of whether the acquired biometric information corresponds to the stored biometric information, that is, an authentication result. The generated response value may include information on whether the acquired biometric information corresponds to the stored biometric information. The generated response value may be encrypted by the private key generated when the authentication is registered.

The processor 130 may transmit the identification information and the generated response value to the cloud server. When the identification information transmitted to the cloud server matches at least one of pieces of identification previously stored in the cloud server, the response value may be transmitted to the authentication server.

Meanwhile, the cloud server may receive the identification information stored in the database 120 when the authentication function is registered and store the received identification information. The cloud server may be associated with a plurality of electronic devices for which the authentication function is registered. In this case, in the cloud server, identification information on each of the electronic devices may be stored.

Accordingly, the cloud server may compare the identification information received from the processor 130 to the stored identification information and when matching identification information is present in the stored identification information, transmit the received response value to the authentication server. When the matching identification information is absent, the cloud server may transmit the authentication request again or terminate the authentication function.

In some cases, the identification information may be stored in the authentication server. In such cases, the cloud server may transmit the received identification information and response value received from the processor 130 to the authentication server. The authentication server may determine whether the received identification information matches at least one of pieces of the stored identification information. When the received identification information matches the stored identification information, the authentication server may decrypt the response value using the public key stored.

When the received identification information does not match the stored identification information, the authentication server may transmit the authentication request again or terminate the authentication function.

In some cases, in the authentication server, a public key for each electronic device for which the authentication registration has been performed may be stored. In such cases, the authentication server may decrypt the response value using the public key of the electronic device 100 related to the received response value.

As an example, the authentication server may identify the electronic device 100 related to the received response value and decrypt the response value using the public key related to the electronic device 100. In this example, when the response value is transmitted from the cloud server to the authentication server, the identification information associated with the electronic device 100 may be transmitted together. In addition, for each public key, information for identifying a related electronic device in the authentication server may be mapped. Based on this, the above-described decryption may be performed.

As another example, the authentication server may attempt to decrypt the response value using each of the stored public keys. That is, the authentication server may randomly select the stored public key and attempt the decryption one by one. Based on this, the decryption for the public key may be performed.

In some cases, information transmitted and received among the electronic device 100, the cloud server, and the authentication server may be encrypted based on a secure sockets layer (SSL) or transport layer security (TLS).

In some cases, the processor 130 may be configured as at least one processor. In such cases, at least one processor may be allocated for each operation or function to implement the above-described operations. However, it is merely an example, and the processor 130 may be provided in various forms for implementing the above-described operations.

Figure 5:
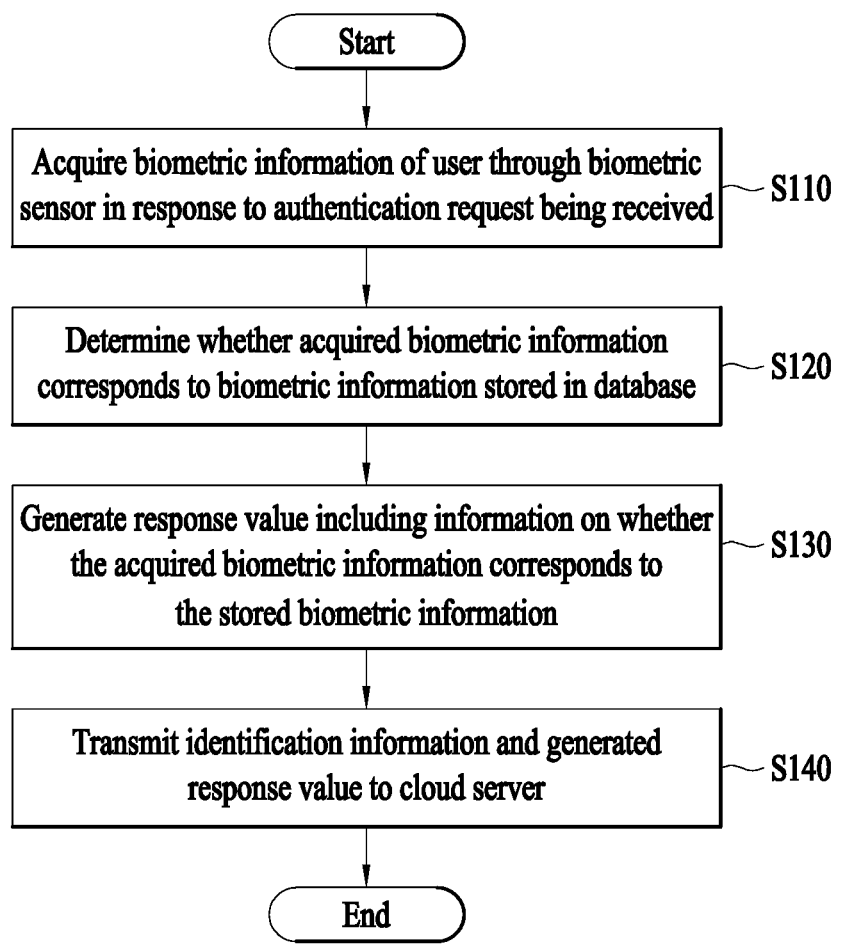
FIG. 5 is a flowchart illustrating an operation of an electronic device in a biometric authentication method according to an example embodiment of the present disclosure.

FIG. 5 is a flowchart illustrating an operation of an electronic device in a biometric authentication method according to an example embodiment of the present disclosure. Operations of FIG. 5 may also be performed in an order different from that shown in the drawing.

Referring to FIG. 5, in operation S110, in response to an authentication request being received, the electronic device 100 may acquire biometric information of a user through the biometric sensor 110. The authentication request is generated by an authentication server, and may be a signal (or information) received in the electronic device 100 through the cloud server.

Specifically, the authentication request may be generated by an authentication server installed in the cloud server based on an execution of an application for executing an operation related to the authentication server. For example, the electronic device 100 that operates based on the cloud server may receive a user input for executing a bank application, so that the bank application is executed. At this time, the bank application may provide a financial function based on the authentication server. Through this, in response to the bank application being executed, the authentication request may be generated by the authentication server.

In operation S120, the electronic device 100 may determine whether the acquired biometric information corresponds to biometric information stored in the database 120. As an example, when fingerprint information acquired in response to the authentication request matches fingerprint information previously stored in the database 120, the electronic device 100 may determine that the acquired fingerprint information corresponds to the previously stored fingerprint information.

As another example, when a similarity between fingerprint information acquired in response to the authentication request and fingerprint information previously stored in the database 120 is calculated to be a predetermined value or more, the electronic device 100 may determine that the acquired fingerprint information corresponds to the previously stored fingerprint information.

The biometric information stored in the database 120 may be acquired from a user in an authentication registration process of the electronic device 100 and stored.

In operation S130, the electronic device 100 may generate a response value including information on whether the acquired biometric information corresponds to the stored biometric information. The response value may be encrypted by a private key generated in the authentication registration process of the electronic device 100.

In operation S140, the electronic device 100 may transmit identification information and the generated response value to the cloud server. The identification information may include information for identifying at least one of a user, a biometric sensor, and an electronic device. For example, the identification information may be information in a form such as a user's name, a type of the biometric sensor, and a unique identification number of the electronic device.

The identification information may be stored in the database 120 in the authentication registration process. However, it is merely an example, and the identification information may be generated at a point in time that the response value is transmitted or before a predetermined period of time from the point in time.

In addition, the identification information may be stored in the cloud server or the authentication server. The identification information stored in the cloud server or the authentication server may be generated in the authentication registration process of the electronic device 100 and stored.

In an example embodiment, identification information on each of a plurality of electronic devices for which an authentication registration is performed may be stored in the cloud server. The cloud server may transmit the response value to the authentication server based on whether the identification information received along with the response value from the electronic device 100 matches one of pieces of the stored identification information. In this case, the authentication server may perform decryption on the received response value. A related description will be made in greater detail with reference to FIG. 7.

In another example embodiment, the cloud server may transmit the response value and the identification information received from the electronic device 100 to the authentication server. In this case, the authentication server may determine whether to decrypt the response value based on previously stored identification information and perform the decryption based on a result of the determining. A related description will be made in greater detail with reference to FIGS. 8 and 9.

Figure 6:
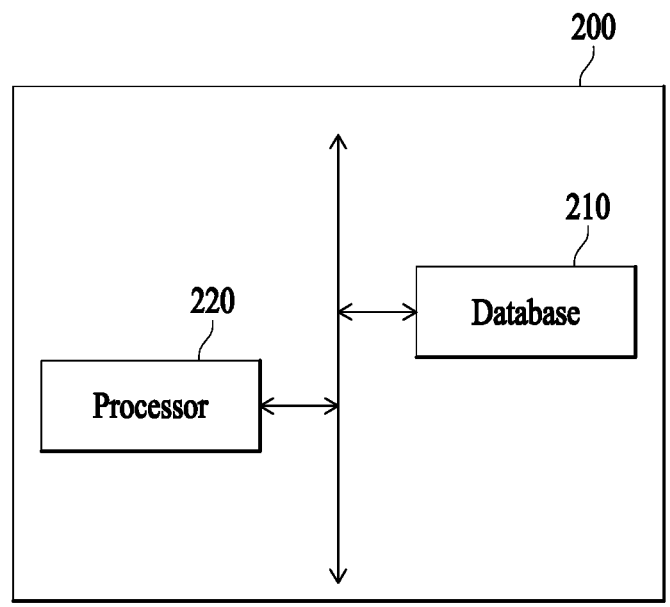
FIG. 6 is a functional block diagram illustrating a cloud server in association with a biometric authentication method according to an example embodiment of the present disclosure.

FIG. 6 is a functional block diagram illustrating a cloud server in association with a biometric authentication method according to an example embodiment of the present disclosure.

Referring to FIG. 6, a cloud server 200 may include a database 210 and a processor 220. The database 210 may operate based on a connection to the processor 220 and may include an individual processor to operate based on the corresponding processor.

The database 210 may store information on a plurality of electronic devices for which a registration of an authentication function is performed with respect to the cloud server 200. Specifically, for each of the electronic devices for which the authentication function is registered, the database 210 may store identification information on at least one of a user, a biometric sensor, and an electronic device.

Identification information may be, for example, information such as a user's name, a type of a biometric sensor, and a unique identification number of the electronic device. However, it is merely an example, and the identification information may be provided in a variety of forms.

Specifically, the database 210 may store information on the plurality of electronic devices for which the authentication function is registered, as shown in Table 1, for example.

TABLE 1

|  | User | Biometric sensor | Electronic device |
|---|---|---|---|
| First ID information | A | Iris | xx |
| Second ID information | A | Fingerprint | xx |
| Third ID information | A | Iris | b |
| Fourth ID information | A | Fingerprint | c |
| Fifth ID information | B | Fingerprint | xy |
| Sixth ID information | B | Fingerprint | b |

The processor 220 may execute operations of various application programs stored in the cloud server. The processor 220 is a part that receives an input or outputs information, and may be connected to the electronic device 100. Also, the processor 220 may provide various functions stored in the processor 220 to the user through the electronic device 100.

For example, when a bank application is stored in the cloud server, the processor 220 may execute the bank application in response to an input to execute the bank application being received through the electronic device 100.

The processor 220 may be connected to an authentication server related to the bank application based on the execution of the bank application. For example, when the bank application is a financial function application provided by a bank "A", the processor 220 may be connected to an authentication server of the bank "A" in response to the bank application being executed.

In an example embodiment, the processor 220 may receive a response value and identification information from the electronic device 100. In this case, the processor 220 may determine whether identification information previously stored in the database 210 includes information matching the identification information received from the electronic device 100. When the previously stored identification information includes information matching the received identification information, the processor 220 may transmit the response value to the authentication server. A related description will be made in greater detail with reference to FIG. 7.

In another example embodiment, when a response value and identification information are received from the electronic device 100, the processor 220 may transmit the received response value and identification information to the authentication server. In this case, matching with identification information may be performed in the authentication server. A related description will be made in greater detail with reference to FIGS. 8 and 9.

Figure 7:
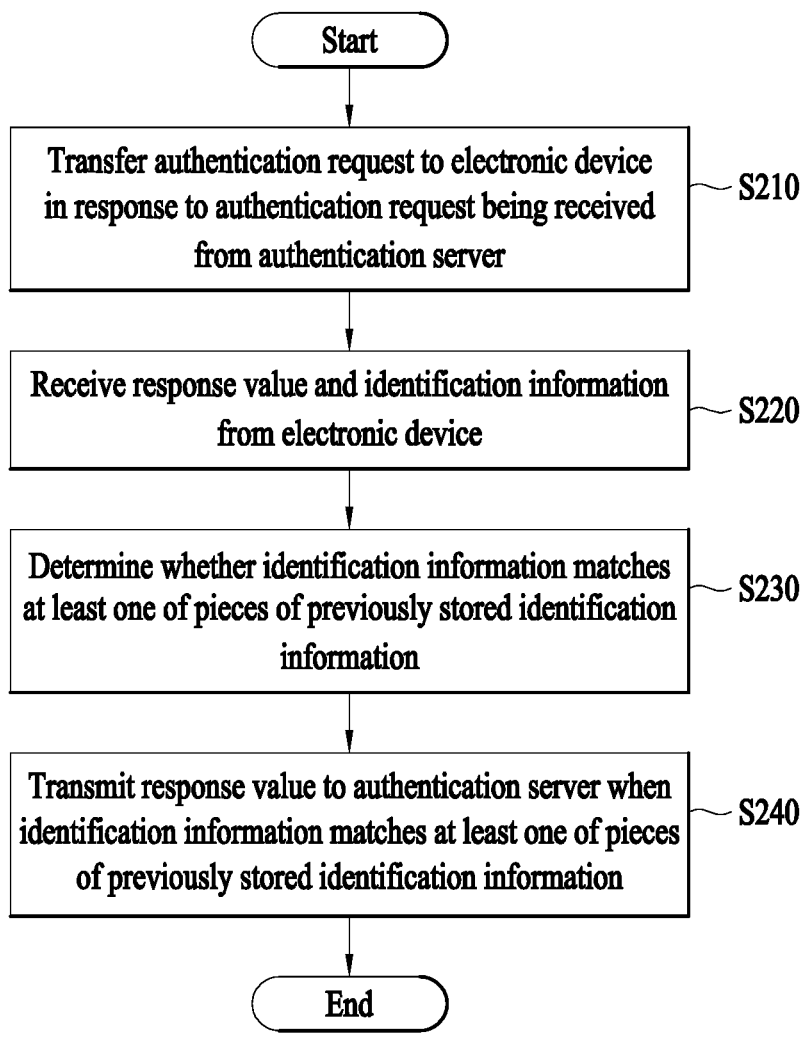
FIG. 7 is a flowchart illustrating an example of an operation of a cloud server in a biometric authentication method according to an example embodiment of the present disclosure.

FIG. 7 is a flowchart illustrating an example of an operation of a cloud server in a biometric authentication method according to an example embodiment of the present disclosure. Specifically, FIG. 7 illustrates an example of a case in which a process of identifying an electronic device using identification information is performed in a cloud server.

Referring to FIG. 7, in operation S210, in response to an authentication request being received from an authentication server, the cloud server 200 may transfer the authentication request to the electronic device 100. Once connected to the authentication server, the cloud server 200 may receive the authentication request from the authentication server. The cloud server 200 may transfer the received authentication request to the electronic device 100.

In operation S220, the cloud server 200 may receive a response value and identification information from the electronic device 100. Here, the response value may be generated by the electronic device 100 in response to the authentication request being transferred. Specifically, the response value may include information on whether user's biometric information acquired using a biometric sensor in response to the authentication request corresponds to biometric information previously stored in the electronic device 100.

In operation S230, the cloud server 200 may determine whether identification information matches at least one of pieces of previously stored identification information. The previously stored identification information may be identification information on each of a plurality of electronic devices for which an authentication registration is performed information on the authentication server. The cloud server 200 may store the identification information on the plurality of electronic devices based on the authentication registration.

In operation S240, when the received identification information matches at least one of the pieces of the previously stored identification information, the cloud server 200 may transmit the response value to the authentication server. When the previously stored identification information includes information matching the received identification information, the cloud server 200 may determine that the matching is successful and thus, transmit the response value to the authentication server.

In this case, the response value may be decrypted by the authentication server, so that an authentication function is provided based on the decrypted response value.

Meanwhile, the response value may be information generated by the electronic device 100 and then encrypted using a private key previously stored in the electronic device 100. The private key may be a key for the use of encryption, and the information encrypted by the private key may be decrypted by a public key generated as a pair at the time of generating the private key.

In this case, the public key may be transmitted to the authentication server at the time of authentication registration and stored in the authentication server. Accordingly, when the response value is received, the authentication server may identify information included in the response value by decrypting the response value using the stored public key.

Figure 8:
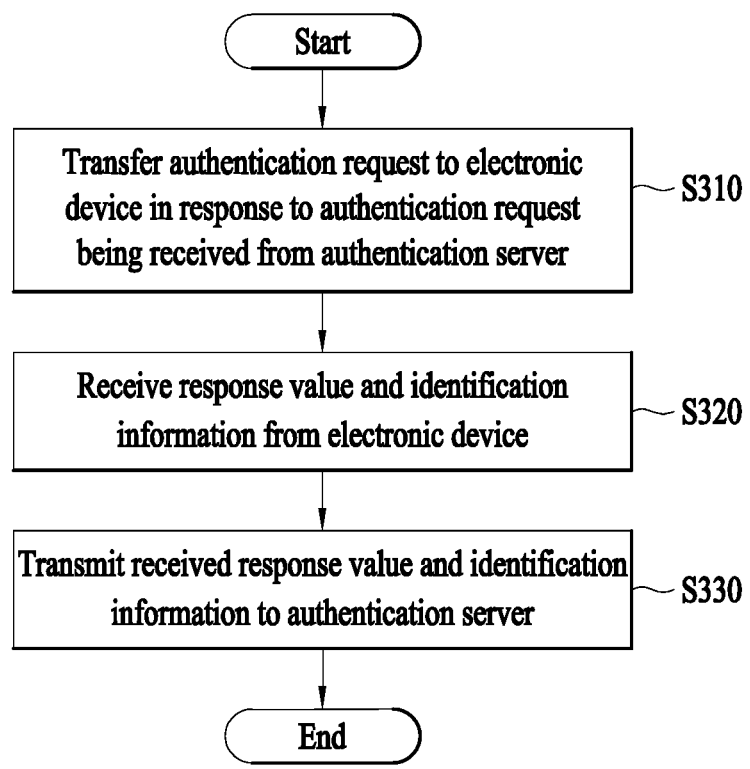
FIG. 8 is a flowchart illustrating another example of an operation of a cloud server in a biometric authentication method according to an example embodiment of the present disclosure.

FIG. 8 is a flowchart illustrating another example of an operation of a cloud server in a biometric authentication method according to an example embodiment of the present disclosure. Specifically, FIG. 8 illustrates an example of a case in which a process of identifying an electronic device using identification information is performed in an authentication server.

Referring to FIG. 8, in operation S310, in response to an authentication request being received from the authentication server, the cloud server 200 may transfer the authentication request to an electronic device. In operation S320, the cloud server 200 may receive a response value and identification information from the electronic device 100. Since operation S310 may correspond to operation S210 of FIG. 7 and operation S320 may correspond to operation S220 of FIG. 7, redundant description will be omitted.

In operation S330, the cloud server 200 may transmit the received response value and identification information to the authentication server.

Figure 9:
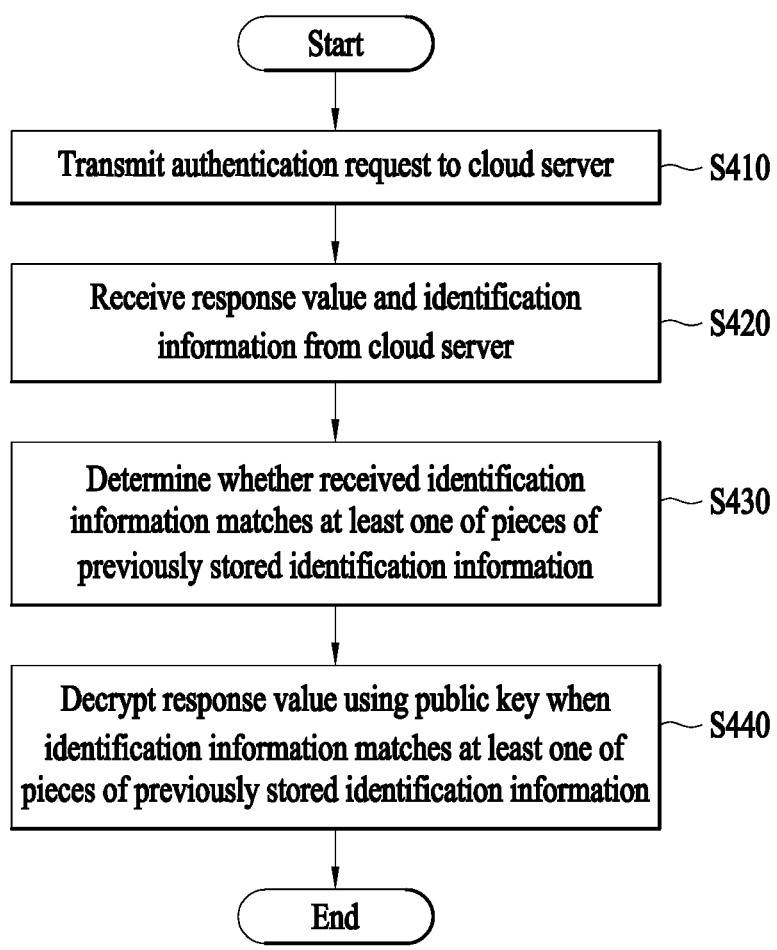
FIG. 9 is a flowchart illustrating an example of an operation of an authentication server in a biometric authentication method according to an example embodiment of the present disclosure.

FIG. 9 is a flowchart illustrating an example of an operation of an authentication server in a biometric authentication method according to an example embodiment of the present disclosure. Specifically, FIG. 9 illustrates an example of a case in which a process of identifying an electronic device using identification information is performed in an authentication server.

Referring to FIG. 9, in operation S410, an authentication server may transmit an authentication request to a cloud server. The authentication server is a server that requires security, and when connected to another device, may transmit the authentication request to the other device. In such an aspect, once connected to a cloud server, the authentication server may transmit the authentication request to the cloud server.

In operation S420, the authentication server may receive a response value and identification information from the cloud server 200. The authentication server may receive a response value generated based on an authentication being performed in response to the authentication response and identification information associated with the authentication. The response value and the identification information may be acquired by the electronic device 100 that operates based on the cloud server 200.

At this time, the response value may be encrypted using a private key of the electronic device 100. Also, the identification information may include information on at least one of a user of the electronic device 100, a biometric sensor included in the electronic device 100, and the electronic device 100.

In operation S430, the authentication server may determine whether the received identification information matches at least one of pieces of previously stored identification information. To use a function related to the authentication server, an authentication registration for an electronic device of a user who is to use the authentication server may be performed in advance. Thus, the authentication server may include identification information on the electronic device for which the authentication registration is performed in advance.

Here, the identification information may include information for identifying at least one of a user of the electronic device for which the authentication registration is performed in advance, a biometric sensor of the electronic device, and the electronic device. Based on this, the authentication server may determine whether the received identification information matches at least one of pieces of the stored identification information.

For example, the authentication server may determine whether the stored identification information includes information of the same content as the received identification information and when the information of the same content is present, determine that the received identification information matches the corresponding information.

The identification information stored in the authentication server may be stored in a form as shown in Table 2, for example.

TABLE 2

| User | Identification information | Public key |
| --- | --- | --- |
| A | User A__Electronic device xx__Iris | Public key 1 |
|  | User A__Electronic device xx__Fingerprint | Public key 2 |
|  | User A__Electronic device b__Iris | Public key 3 |
|  | User A__Electronic device c__Fingerprint | Public key 4 |
| B | User B__Electronic device xy__Fingerprint | Public key 5 |
|  | User B__Electronic device b__Fingerprint | Public key 6 |
|  | User B__Electronic device c__Fingerprint | Public key 7 |

In operation S440, when the identification information matches at least one of the pieces of the previously stored identification information, the authentication server may decrypt a response value using a public key. Specifically, when the identification information matches at least one of the pieces of the previously stored identification information, the authentication server may select a public key corresponding to the identification information from stored public keys and perform decryption on the response value.

When the identification information matches none of the pieces of the previously stored identification information, the authentication server may transmit the authentication request again or disallow the authentication server to be used.

According to an example embodiment of the present disclosure, when an electronic device that operates based on a cloud server is used, a sensor (e.g., biometric sensor) may be used to provide an authentication function through the sensor on the cloud server.

Further, according to an example embodiment of the present disclosure, it is possible to improve security by verifying whether a user is authenticated and registered based on identification information for a function that requires security, such as an authentication in association with a characteristic of a cloud server to be used by numerous users through registration of a plurality of accounts.

Each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

The invention claimed is:

1. An electronic device that operates based on a cloud server, the electronic device comprising:
    a biometric sensor;
    a database in which identification information on at least one of the biometric sensor, a user, and the electronic device and biometric information registered by the biometric sensor are stored; and
    at least one processor,
    wherein the at least one processor is configured to:
    receive an authentication request of an authentication server through the cloud server;
    acquire biometric information of a user through the biometric sensor in response to the authentication request being received;
    determine whether the acquired biometric information corresponds to biometric information stored in the database and generate a response value comprising information on whether the acquired biometric information corresponds to the stored biometric information; and
    transmit the generated response value and the identification information to the cloud server, and
    the generated response value is transmitted to the authentication server from the cloud server when the transmitted identification information matches at least one of pieces of identification information previously stored in the cloud server.

2. The electronic device of claim 1, wherein the generated response value is encrypted based on a registered private key and decrypted by a designated public key, and
    the public key is stored in the cloud server or the authentication server.

3. The electronic device of claim 1, wherein, in the cloud server, an authentication function to perform a user authentication using the biometric sensor in association with the electronic device is registered, and
    the identification information previously stored in the cloud server is information stored in a process of registering the authentication function.

4. The electronic device of claim 1, wherein when authentication functions of a plurality of electronic devices are registered in the cloud server, the identification information previously stored in the cloud server comprises identification information on each of the plurality of electronic devices.

5. The electronic device of claim 4, wherein when the plurality of electronic devices comprises a first electronic device and a second electronic device, the identification information on each of the plurality of electronic devices comprises first identification information on the first electronic device and second identification information on the second electronic device,
    the first identification information comprises information on at least one of a biometric sensor included in the first electronic device, a user of the first electronic device, and the first electronic device, and
    the second identification information comprises information on at least one of a biometric sensor included in the second electronic device, a user of the second electronic device, and the second electronic device.

6. The electronic device of claim 5, wherein when the first electronic device comprises a plurality of biometric sensors, sensor information for each of the plurality of biometric sensors comprises a plurality of pieces of different identification information.

7. The electronic device of claim 1, wherein the identification information stored in the database comprises information on the biometric sensor, information on the user, and information on the electronic device,
    the information on the biometric sensor comprises a type of the biometric sensor or a type of the biometric information,
    the information on the user comprises an identification (ID) of a user account registered in the electronic device or a name of the user, and
    the information on the electronic device comprises a type of the electronic device or a predetermined identification number assigned to the electronic device.

8. The electronic device of claim 1, wherein the biometric sensor comprises at least one of an iris recognition sensor, a fingerprint recognition sensor, and a facial recognition sensor.

9. A biometric authentication method of an electronic device that operates based on a cloud server, the biometric authentication method comprising:
    receiving an authentication request of an authentication server through the cloud server;
    acquiring biometric information of a user through a biometric sensor in response to the authentication request being received;
    determining whether the acquired biometric information corresponds to biometric information previously stored and generating a response value comprising information on whether the acquired biometric information corresponds to the previously stored biometric information; and
    transmitting the generated response value and identification information on at least one of the biometric sensor, a user, and the electronic device to the cloud server,
    wherein the generated response value is transmitted to the authentication server from the cloud server when the transmitted identification information matches at least one of pieces of identification information previously stored in the cloud server.

10. The biometric authentication method of claim 9, wherein the generated response value is encrypted based on a registered private key and decrypted by a designated public key, and
    the public key is stored in the cloud server or the authentication server.

11. The biometric authentication method of claim 9, wherein, in the cloud server, an authentication function to perform a user authentication using the biometric sensor in association with the electronic device is registered, and the identification information previously stored in the cloud server is information stored in a process of registering the authentication function.

12. The biometric authentication method of claim 9, wherein when authentication functions of a plurality of electronic devices are registered in the cloud server, the identification information previously stored in the cloud server comprises identification information on each of the plurality of electronic devices.

13. The biometric authentication method of claim 12, wherein when the plurality of electronic devices comprises a first electronic device and a second electronic device, the identification information on each of the plurality of electronic devices comprises first identification information on the first electronic device and second identification information on the second electronic device, the first identification information comprises information on at least one of a biometric sensor included in the first electronic device, a user of the first electronic device, and the first electronic device, and the second identification information comprises information on at least one of a biometric sensor included in the second electronic device, a user of the second electronic device, and the second electronic device.

14. The biometric authentication method of claim 13, wherein when the first electronic device comprises a plurality of biometric sensors, sensor information for each of the plurality of biometric sensors comprises a plurality of pieces of different identification information.

15. The biometric authentication method of claim 9, wherein the identification information on at least one of the biometric sensor, the user, and the electronic device comprises information on the biometric sensor, information on the user, and information on the electronic device, the information on the biometric sensor comprises a type of the biometric sensor or a type of the biometric information, the information on the user comprises an identification (ID) of a user account registered in the electronic device or a name of the user, and the information on the electronic device comprises a type of the electronic device or a predetermined identification number assigned to the electronic device.

16. A biometric authentication system using a cloud server, the biometric authentication system comprising:

the cloud server;

an electronic device that operates based on the cloud server; and an authentication server to which an authentication is requested, wherein the electronic device comprises a biometric sensor, a database in which identification information on at least one of the biometric sensor, a user, and the electronic device and biometric information registered by the biometric sensor are stored, and at least one processor, the at least one processor is configured to receive an authentication request of an authentication server through the cloud server, acquire biometric information of a user through the biometric sensor in response to the authentication request being received, determine whether the acquired biometric information corresponds to biometric information stored in the database, generate a response value comprising information on whether the acquired biometric information corresponds to the stored biometric information, and transmit the generated response value and the identification information to the cloud server, the cloud server is configured to provide the response value and the identification information to the authentication server, and the authentication server is configured to decrypt the response value using a previously stored public key when the identification information matches at least one of pieces of identification information previously stored in the authentication server.

* * * * *